United States Patent [19]
Hsu

[11] Patent Number: 5,689,107
[45] Date of Patent: Nov. 18, 1997

[54] DISPLACEMENT-BASED OPTO-ELECTRONIC ACCELEROMETER AND PRESSURE SENSOR

[75] Inventor: Tsung-Yuan Hsu, Westlake Village, Calif.

[73] Assignee: Hughes Aircraft Company, Los Angeles, Calif.

[21] Appl. No.: 522,877

[22] Filed: Sep. 1, 1995

[51] Int. Cl.[6] .................................................. G01D 5/34
[52] U.S. Cl. ............................. 250/231.1; 356/373
[58] Field of Search ........................ 250/231.19, 231.11, 250/231.1, 231.13, 306, 307; 73/705, 715, 706, 517 AV, 653, 654; 356/376, 373

[56] References Cited

U.S. PATENT DOCUMENTS

| | | | |
|---|---|---|---|
| 4,547,668 | 10/1985 | Tsikos | 250/231.19 |
| 4,724,318 | 2/1988 | Binnig | 250/306 |
| 4,806,755 | 2/1989 | Duerig et al. | 250/306 |
| 5,085,070 | 2/1992 | Miller et al. | 73/105 |
| 5,146,083 | 9/1992 | Zuckerwar et al. | 250/231.19 |
| 5,209,117 | 5/1993 | Bennett | 73/514.1 B |
| 5,241,862 | 9/1993 | Abbink et al. | 73/517 B |
| 5,245,863 | 9/1993 | Kajimura et al. | 250/306 |
| 5,265,470 | 11/1993 | Kaiser et al. | 73/178 R |
| 5,275,047 | 1/1994 | Zabler et al. | 73/505 |
| 5,285,686 | 2/1994 | Peters | 73/505 |
| 5,290,102 | 3/1994 | Kaiser et al. | 324/120 |
| 5,293,781 | 3/1994 | Kaiser et al. | 73/862.625 |
| 5,315,247 | 5/1994 | Kaiser et al. | 324/244 |
| 5,377,545 | 1/1995 | Norling et al. | 73/514.1 B |
| 5,385,053 | 1/1995 | Wlodarczyk et al. | 250/231.19 |
| 5,431,051 | 7/1995 | Biebl et al. | 73/514.86 |
| 5,438,870 | 8/1995 | Zabler et al. | 73/504.02 |
| 5,446,279 | 8/1995 | Hsu | 250/227.21 |

FOREIGN PATENT DOCUMENTS

| | | |
|---|---|---|
| 0619494A1 | 10/1994 | European Pat. Off. . |
| 40 32 559 A1 | 4/1992 | Germany . |
| 59-171141 | 1/1985 | Japan . |
| 3-101127 | 4/1991 | Japan . |
| 404369418A | 12/1992 | Japan ........................ 73/105 |

OTHER PUBLICATIONS

Benecke, W., et al. "*Micro Electro Mechanical Systems*" US, New York, IEEE. Feb. 4–7, 1992, pp. 214–219.
Kenny, T.W., et al. "*Micromachined tunneling displacement transducers for physical sensors*" Journal of Vacuum Science & Technology, Jul./Aug., 1993, pp. 797–802.
Kaiser, J.W., et al. "*Tunnel–Effect Displacement Sensor*" NTIS Tech Notes, Apr., 1990, p. 346.

*Primary Examiner*—Que Le
*Attorney, Agent, or Firm*—V. D. Duraiswamy; W. K. Denson-Low

[57] ABSTRACT

An opto-electronic accelerometer and pressure sensor formed on a substrate are disclosed. The sensor includes a light source and a plurality of light detectors exposed on a semiconductor substrate. A cantilever beam extends over the substrate. The cantilever beam is positioned such that it reflects light from the light source as an applied force urges the cantilever beam to deflect relative to the plurality of light detectors. Acceleration or pressure can be determined by the slope change of the cantilever beam and is computed by taking the ratio of illumination between corresponding light detectors. In an alternative embodiment, the cantilever beam includes a proof mass. In a further embodiment, a pressure sensor is coupled with a linkage rod which is connected to the cantilever beam and then connected to a diaphragm which is displaced as a pressure is applied. In another embodiment, a diaphragm extends over a substrate, and pressure is measured as a function of the change in the diaphragm curvature as the diaphragm reflects light from the light source to deflect relative to a plurality of light detectors. The sensor further includes an electronic signal processing chip to calculate acceleration and pressure.

24 Claims, 3 Drawing Sheets

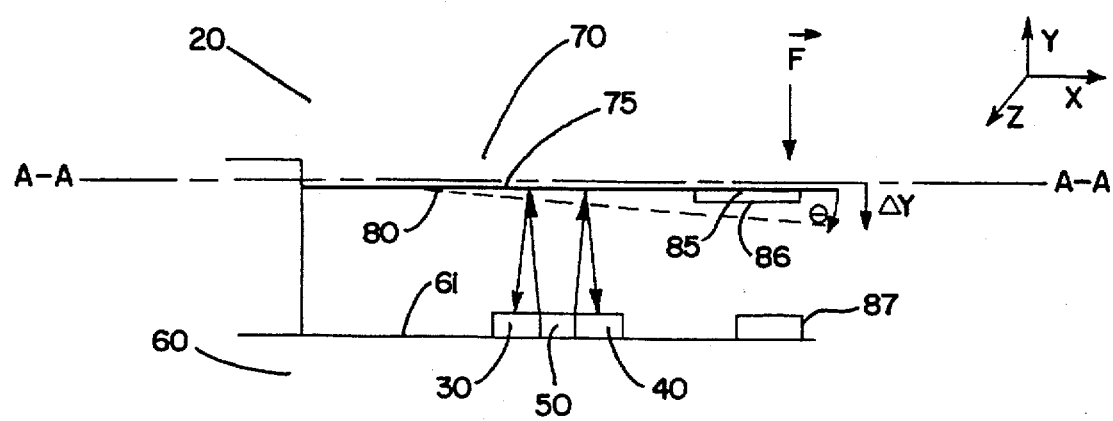

DISPLACEMENT-BASED OPTO-ELECTRONIC ACCELEROMETER AND PRESSURE SENSOR

BACKGROUND OF THE INVENTION

1. Field of the Invention

The present invention generally relates to the field of electro-mechanical sensors for measuring an applied force, and more specifically to an opto-electronic accelerometer and pressure sensor.

2. Description of the Related Art

One method of sensing physical quantities such as linear acceleration, or acoustic and hydrophobic pressure is to provide a flexible member that flexes in response to an applied force and measures the amount of flex. The most promising technology for the mass production of sensors for automotive, industrial and military applications are sensors using microelectronics micro-machining fabrication technology. These sensors typically use variable capacitance or piezoresistivity to transfer a change in an exerted force into a proportional electrical signal. Fiber optic sensors have also been used to sense and quantify an exerted force.

A particular fiber optic sensor is disclosed in U.S. Pat. No. 5,446,279, which issued to the same inventor of the present application. In the device disclosed in U.S. Pat. No. 5,446,279, a first surface of a diaphragm is exposed to high temperature gas in a combustion chamber. In response to the gas pressure, the curvature of the diaphragm changes. Three optical fibers are spaced along a radius of the diaphragm and have ends which face a second surface of the diaphragm. A light source injects light into a center fiber, which is displaced from the center of the diaphragm by a predetermined distance. The two outer fibers receive light from the center fiber after it is reflected from the second diaphragm surface. Because of the curvature of the reflecting diaphragm, the relative intensities of the reflected light received by one of the receiving fibers will differ from that received by the other. The relative intensities of the light reflected from the diaphragm into the outer fibers correspond to the curvature of the diaphragm and consequently to pressure. The pressure can then be computed in response to the relative reflected light intensities.

Although this fiber optic pressure sensor reduces the sensitivity of the sensor to optical noise caused by physical perturbations, fiber optic based sensors are inherently fragile and require alignment of their light sources. For example, optical coupling loss can be as high as 80 percent when coupling a light-emitting diode (LED) into an optical fiber. The fiber optic cabling of such sensors is particularly sensitive to severe vibration and bending during installation.

SUMMARY OF THE INVENTION

The present invention is an opto-electronic accelerometer and pressure sensor having a large dynamic range, excellent linearity, high sensitivity, rugged and robust construction, no required temperature compensation, low cost and minimum electromagnetic interference.

These goals are achieved by a sensor formed over a substrate of clay materials such as semiconductors, ceramics, etc. The sensor includes a light source and a plurality of light detectors exposed on a substrate. A cantilever beam extends from and over the substrate. The cantilever beam is positioned such that it reflects light from the light source as an applied force urges the cantilever beam to deflect relative to the plurality of light detectors. Acceleration or pressure is determined by detecting the slope change of the cantilever beam and is computed by taking the illumination ratio between corresponding light detectors. In an alternative embodiment, the cantilever beam includes a proof mass. In a further embodiment, the cantilever beam is coupled to a linkage rod which is then connected to a diaphragm whose curvature changes as a pressure is applied. In another embodiment, a diaphragm extends over a substrate and is edge clamped to cylindrical portion which extend from the substrate. In this embodiment, pressure is measured as a function of the change in the diaphragm curvature as the diaphragm reflects light from the light source to deflect relative to a plurality of light detectors. In each of the above-described embodiments, the sensor further includes an electronic signal processing chip which can compute acceleration and pressure.

These and other features and advantages of the present invention will be apparent to those skilled in the art from the following detailed description, taken together with the accompanying drawings, in which like reference numerals refer to like parts.

BRIEF DESCRIPTION OF THE DRAWINGS

FIG. 1 is a perspective view showing the preferred sensor;

FIG. 2 is a plan view of the preferred sensor's reflected light patterns;

DETAILED DESCRIPTION OF THE INVENTION

Figure 3:
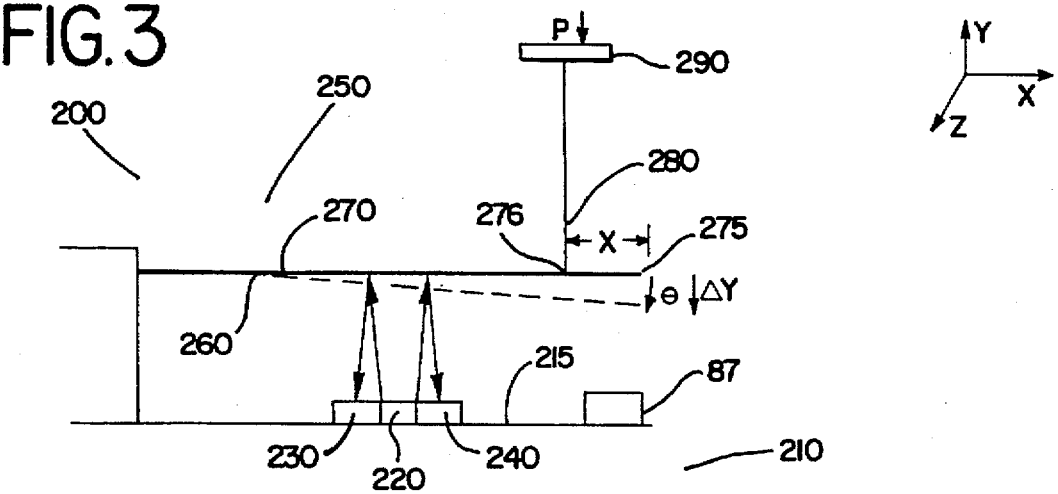
FIG. 3 is a perspective view showing a linkage rod pressure sensor.

FIG. 1 illustrates a sensor 20 embodying the present invention. The sensor 20 includes a light source 50, light detectors 30 and 40 and a cantilever beam 70 on a substrate 60 having a first surface 61. The cantilever beam 70 has a first surface 75 and a second surface 80. The light detectors 30, 40 are positioned on opposite sides of the light source 50. In the preferred embodiment, the light detectors 30, 40 are placed linearly and directly adjacent the light source 50, and the light source 50 and light detectors 30, 40 are positioned along axis A—A extending through the cantilever beam 70. For illustrative purposes, FIG. 1 shows axis A—A to be adjacent the cantilever beam 70.

The light detectors 30, 40 can be placed a proximate distance from the light source 50 so long as reflected light from the cantilever beam 70 is still incident upon the cross-sections of the light detectors 30, 40. Light detectors having a square cross-section are preferred in order to maximize the sensor's linearity and dynamic range. Circular light detectors could also be used in combination with rectangular or square cross-sections. In the preferred embodiment, the light source is a light-emitting diode but other types of light emitting sources may be used.

The cantilever beam 70 is preferably a nonunitary cantilever consisting of more than one discrete element. Alternatively, the cantilever beam 70 may be manufactured as a unitary structure via photolithography on the semiconductor wafer 60. A proof mass 85 having a first surface 86 is provided on either the first surface 75 or the second surface 80 of the cantilever beam 70. Preferably, the proof mass 85 is on the second surface 80 and positioned above the light source 50. The first surface 86 of the proof mass 85 may be a polished metal or any other type of reflective surface.

The cantilever beam 70 extends from the semiconductor substrate 60 and is suspended over the light source 50 and light detectors 30, 40. Preferably, the cantilever beam 70 extends directly over the light source 50 and detectors 30, 40 such that the x-z plane formed by the light source 50 and detectors 30, 40 is parallel to the x-z plane formed by the second surface 80 of cantilever beam 70 or the first surface 86 of a proof mass 85. A second cantilever beam could be included on the semiconductor substrate such that a gyro device is formed.

The distance between the cantilever beam 70 and light source and light detectors should be selected such that, without an exerted force $\bar{F}$ on cantilever beam 70, the edge of the incident light from the light source 50 reflected off the second surface 80 of the cantilever beam 70 or the first surface 86 of the proof mass 85 reaches approximately the center portion of both light detector 30 and light detector 40. Such placement maximizes the sensor's linearity and sensitivity. However, the light detector and light source 50 can be positioned anywhere below the cantilever beam 70 because upon movement of the cantilever 70 via a force $\bar{F}$, the slope of the urged cantilever 70 will be constant.

Figure 6:
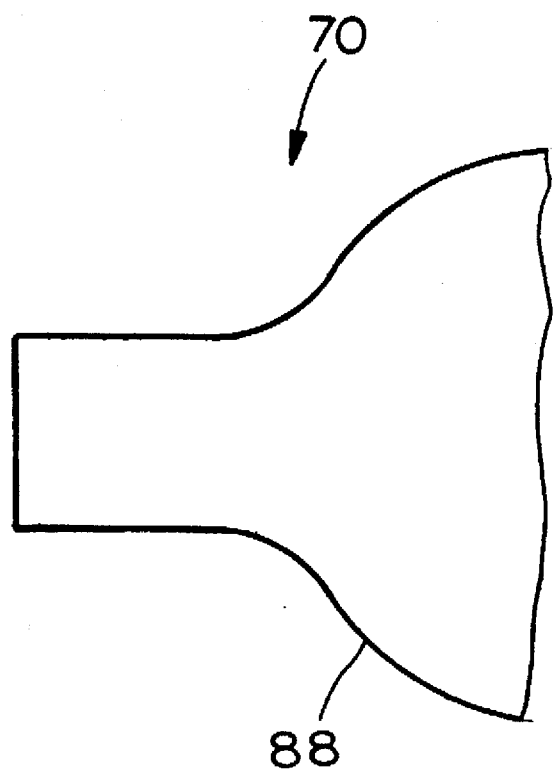
FIG. 6 is a fragmentary, plan view of a cantilever beam of the preferred sensor of FIG. 1.

In response to the application of a force $\bar{F}$, the cantilever beam 70 is urged in either the positive or negative y-axis direction. The cantilever beam 70 bends itself such that the change in slope of its second surface 80 may not be completely constant. As shown in FIG. 6, the cantilever beam 70 preferably has a non-uniform width such that the cantilever beam 70 bends at its narrower width, and therefore the wider portion 88 of the cantilever beam has a constant slope.

FIG. 2 illustrates a plan view of three patterns 90, 100, 110 of reflected incident light. The first pattern, 100, is of light from the light source 50 having been reflected from the second surface 80 of the cantilever beam 70 or the first surface 86 of a proof mass 85 and then across light detectors 30 and 40. Without a force $\bar{F}$ exerted, the plane formed by the light source 50 and the light detectors 30, 40 is parallel to the reflective surface of the cantilever 70 or the proof mass 85 at a distance such that the edge of reflected light beam pattern from the light source 50 reaches roughly the center portion of the detectors 30, 40 as shown by pattern 100. Without acceleration or pressure, the cantilever beam 70 is parallel to the sensor substrate surface 60 and the light intensities collected by photo detectors 30 and 40 are equal.

Upon acceleration or upon the application of pressure, the cantilever beam 70 is deflected at an angle θ which is proportional to the displacement Δy of the cantilever beam 70 having a fixed length L. The displacement Δy is proportional to the mass m of the cantilever and acceleration a, and is inversely proportional to the spring constant k of the cantilever beam such that θ can be represented by $\theta \propto \Delta y = a*m/k$. The reflected light incident upon and collected by light detectors 30, 40 will differ by an amount linearly proportional to the deflection angle θ and acceleration a.

The second pattern 90 in FIG. 2 represents the reflected light pattern where a force $\bar{F}$ is exerted on the cantilever beam in the negative y-axis direction, and the third pattern 110 represents the reflected light pattern where a force $\bar{F}$ is exerted in the positive y-axis direction.

The reflected light ($I_{30}$, $I_{40}$) collected by light detector 30, and by light detector 40, can be represented by, $I_{30}=R*I_0*(1+C*a)$, and $I_{40}=R*I0*(1-C*a)$ respectively, where $I_0$ is the intensity of the light output from the light source 50, R is the reflectivity of the second surface 80 of the cantilever beam 70 or the first surface 86 of the proof mass 85, and C is a constant which is dependent on the physical parameters of the cantilever and/or proof mass if provided. The relationship between acceleration, a, and light intensities $I_{30}$ and $I_{40}$ may be obtained by taking the ratio of their difference over their sum. Therefore, $C*a=(I_{30}-I_{40})/(I_{30}+I_{40})$ such that acceleration a is given by $a=(1/C)(I_{30}-I_{40})/(I_{30}+I_{40})$. As this result shows, the measured acceleration is independent of the distance between the cantilever beam 70 or the proof mass 85 and the first surface of the substrate 61, the reflectivity R of the cantilever or a proof mass, and the intensity $I_0$ of the light source. As a consequence, the sensor 20 is quite insensitive to its working environment.

This same sensing scheme can be used to sense pressure using a linkage rod pressure sensor. Such a structure is particularly suitable for high temperature environment applications where the opto-electronic components must be isolated from high temperature and/or high pressure environments. FIG. 3 shows a preferred embodiment of a linkage rod pressure sensor 200. As in the previous preferred embodiment, this linkage rod pressure sensor comprises of a substrate 210 having a first surface 215. A light source 220 and first and second light detectors 230, 240 reside on the substrate 210. In this alternative embodiment, a linkage rod 280 is attached to the cantilever beam 250 at linkage rod connection point 276 located a distance x from the cantilever beam end 275.

The linkage rod 280 is then attached to a diaphragm 290. As pressure exerts a force on the diaphragm 290, the diaphragm undergoes a displacement in either the positive or negative y-axis direction and a force is exerted on the linkage rod 280. Consequently, a force is exerted by way of the linkage rod 280 upon the first surface 270 of the cantilever beam 250.

If no pressure is applied to cantilever beam 250, the beam will remain parallel to the first surface 215 of the semiconductor substrate 210, and the reflected light intensity collected by light detectors 230, 240 will be equal. If a positive pressure P is applied to the diaphragm 290, the diaphragm 290 undergoes a displacement in the negative y-axis direction. If a negative pressure P is applied, diaphragm 290 will develop a concave shape. Under either scenario, the diaphragm 290 produces a displacement Δy which is linearly proportional to pressure P. This displacement makes the second surface 260 of cantilever beam 250 deflect at an angle θ which is proportional to displacement Δy. Deflection angle θ is proportional to the displacement Δy=A*P where A is a constant determined by the physical parameters of the diaphragm 290.

The reflected light collected by light detectors 230, 240 differs by an amount linearly proportional to applied pressure P. When $I_{230}>I_{240}$, the pressure is positive, and when $I_{240}>I_{230}$, the pressure is negative.

FIG. 2 also illustrates a plan view of the linkage rod sensor's reflected light patterns. The first pattern 100 represents the intensity pattern of the linkage rod pressure sensor at equilibrium. The second pattern 90 represents the cumulative intensity pattern with a positive pressure exerted on diaphragm 290, and the third pattern 110 represents the cumulative intensity pattern with a negative pressure.

In FIG. 3, the reflected light ($I_{230}$, $I_{240}$) collected by detector 230, and detector 240, can be represented by $I_{230}=R*I_0*(1+C*p)$, and $I_{240}=R*I_0(1-C*P)$, respectively, where $I_0$ is the intensity of the light output from the light source 220, R is the reflectivity of the second surface 260 of the cantilever beam 250. C is a constant that depends on the beam divergent angle of the light source, constant A and other design parameters such as the distance x between the cantilever end 275 and the linkage rod connection point 276. The relationship between pressure, P, and light intensities $I_{230}$ and $I_{240}$ may be obtained by taking the ratio of their difference over their sum. Therefore, $(I_{230}-I_{240})/(I_{230}+I_{240})=C*P$ such that $P=(1/C)(I_{230}-I_{240})/(I_{230}+I_{240})$. The resulting equation shows that the measured pressure, P, is independent of the distance between the reflective surface of the cantilever beam and the light source and the sensor, the reflectivity of the second surface of the cantilever beam and the intensity $I_0$ of the light source 220. The linkage rod pressure sensor, therefore, is quite insensitive to its working environment.

Figure 4:
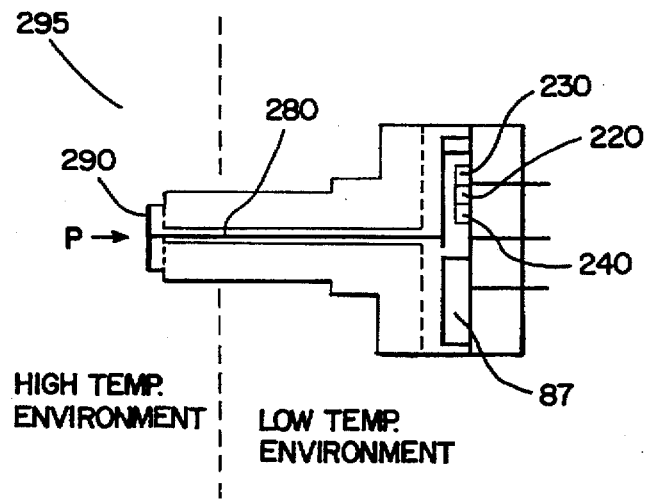
FIG. 4 is a perspective view of a linkage rod pressure sensor incorporated in a high temperature combustion chamber.

FIG. 4 is a perspective view of a linkage rod pressure sensor 295 incorporated in a high temperature, high pressure chamber. FIG. 4 illustrates how a linkage rod pressure sensor can be used to isolate the diaphragm 290, which is in a high temperature environment, from the opto-electronics, which are in a low temperature environment.

Figure 5:
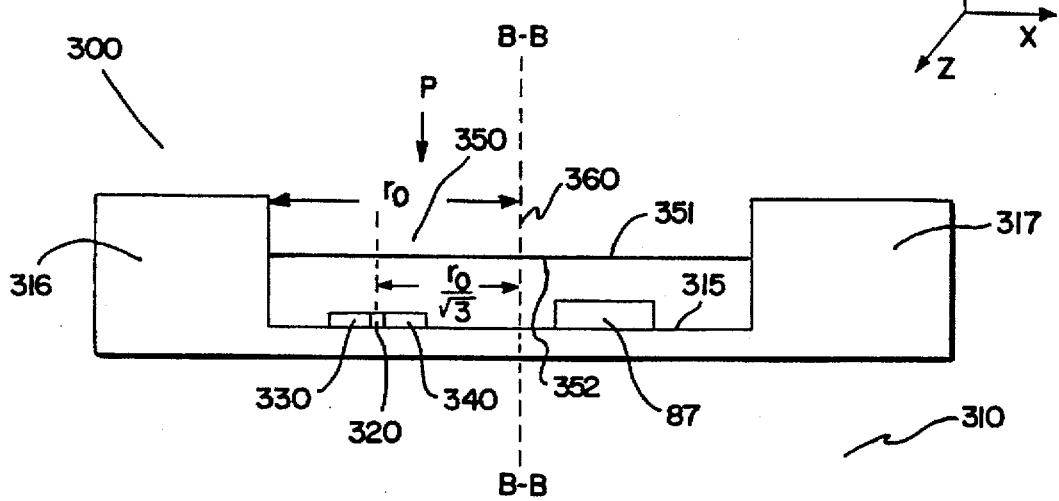
FIG. 5 is a perspective view of an edge clamped pressure sensor.

FIG. 5 shows an edge clamped pressure sensor 300 having a substrate 310 with a first surface 315, a light source 320 and light detectors 330 and 340 on the first surface 315. Preferably, the substrate 310 has first and second cylindrical support portions 316, 317 which extend from the substrate 310. A diaphragm 350, having a first surface 351 and a second surface 352, extends over the substrate 310 and is edge clamped to cylindrical support portions 316 and 317. Alternatively, the diaphragm 350 may be clamped or attached to discrete elements placed on the substrate 310.

The light source 320 and light detectors 330, 340 should be a distance from the center of the diaphragm such that a differential in reflected light intensities is maintained as pressure P urges a change in diaphragm curvature. Preferably, the distance from either the first or second cylindrical support portion 316, 317 to the center of the diaphragm 360 (indicated in FIG. 5 as axis B—B) is represented by the radius of the diaphragm, $r_0$. The light source 320 is placed at a distance $r_0$ divided by the square root of three from the center of the diaphragm 360. At this point, the radial slope of the diaphragm 350 is at a maximum, thereby providing the sensor 300 with maximum sensitivity and linearity.

Pressure can be determined by detecting the curvature of the diaphragm. If the pressure P applied to the surface of the diaphragm 350 is zero, the diaphragm remains flat. If the pressure P is greater than zero, the diaphragm is curved by the applied pressure such that its surface becomes convex. With the diaphragm 350 in this position, more light will be reflected from the surface 352 to detector 330 then detector 340. Therefore, $I_{330}$ will be greater than $I_{340}$.

When the pressure P is less than zero, the second surface 352 of diaphragm 350, which faces the detectors 330, 340, is concave. More light is reflected from the surface 352 to the detector 340 than detector 330, such that $I_{340}$ is greater than $I_{330}$. In the case of a positive or negative pressure, the calculation of the pressure exerted on the diaphragm can be determined based on the calculations previously disclosed in connection with the linkage rod pressure sensor. In this manner, sensor 300 is capable of sensing both the magnitude and sign (positive or negative) of the pressure P.

An electronic processing chip 87 may be used as part of any of the disclosed embodiments. Among other functions, this processing chip can be of the type capable of performing the computations for acceleration or pressure. This chip can be manufactured either during the micro-machining of the original sensor substrate or it may be a separate chip altogether. Placement of this processing chip need not be on the substrate itself.

Thus, the above-described opto-electrical accelerometers and pressure sensors require no critical alignment between the light source and light detectors. The devices consist of simple optics and electronics which assist in the fabrication and yield of low cost devices. In addition, the disclosed sensors can utilize cost effective micro-machining technology. The disclosed sensors are rugged in construction without any extending cables or wires and are impervious to electromagnetic interference.

While several illustrative embodiments of the invention have been shown and described, numerous variations and alternative embodiments will occur to those skilled in the art. Such variations and alternate embodiments are contemplated, and can be made without departing from the spirit and scope of the invention as defined by the appended claims.

I claim:

1. A sensor comprising:
   a substrate;
   a light source on said substrate;
   a plurality of light detectors comprising a first light detector and a second light detector on said substrate;
   a cantilever beam spaced from said substrate; said cantilever beam comprising:
      a reflective portion such that light from said light source is reflected to said first light detector and said second light detector; and
      a flexible portion such that an applied force effects a displacement of said cantilever beam; and
   means for determining a quantity representative of a magnitude of said applied force by comparing light collected by said first light detector with light collected by said second light detector.

2. The sensor of claim 1, wherein said light source is a light emitting diode.

3. The sensor of claim 1, wherein said first light detector and said second light detector each comprise a photodetector.

4. The sensor of claim 1, wherein said cantilever beam further comprises a proof mass.

5. The sensor of claim 1, wherein said light source is positioned between said first light detector and said second light detector.

6. The sensor of claim 5, wherein said light source, said first light detector and said second light detector are positioned along an axis through said cantilever beam.

7. The sensor of claim 6, wherein said first light detector and said second light detector each have a rectangular active area.

8. The sensor of claim 1, wherein said comparing means comprises an electronic signal processing chip on said substrate.

9. The sensor of claim 1, wherein:
   said reflective portion of said cantilever beam comprises a reflective surface; and
   said applied force results from an acceleration that effects said displacement of said cantilever beam to modify a slope of said reflective surface.

10. The sensor of claim 1, wherein:
    said reflective portion of said cantilever beam comprises a reflective surface; and said applied force results from a pressure change that effects said displacement of said cantilever beam to modify a slope of said reflective surface.

11. The sensor of claim 10, wherein a linkage rod engages said cantilever beam.

12. The sensor of claim 11, wherein a diaphragm engages said linkage rod.

13. The sensor of claim 1, wherein said flexible portion of said cantilever beam is narrower than a remainder of said cantilever beam.

14. The sensor of claim 1, wherein:

said light collected by said first light detector is represented by a first intensity $I_1$;

said light collected by said second light detector is represented by a second intensity, $I_2$;

said determining means calculates a value proportional to $(I_1-I_2)/(I_1+I_2)$.

15. The sensor of claim 1, wherein said substrate comprises semiconductive material.

16. The sensor of claim 1, wherein said substrate comprises ceramic material.

17. A sensor comprising:

a substrate;

a light source on said substrate;

a plurality of light detectors on said substrate;

a diaphragm spaced from said substrate;

said diaphragm comprising a reflective surface that effects a reflection of light from said light source to said plurality of light detectors such that an applied force effects a displacement of said reflective surface of said diaphragm to modify said reflection of light to said plurality of light detectors.

18. The sensor of claim 17, further comprising means for determining a quantity representative of a magnitude of said applied force by comparing said light collected by each light detector.

19. The sensor of claim 18, wherein said substrate has a cylindrical portion extending from said substrate and wherein said diaphragm edge is clamped to said cylindrical portion.

20. The sensor of claim 19, wherein said applied force results from a pressure change that induces said displacement of said reflective surface.

21. The sensor of claim 20, wherein said substrate comprises semiconductive material.

22. The sensor of claim 20, wherein said substrate comprises ceramic material.

23. The sensor of claim 20, wherein said plurality of light detectors comprises a first light detector and a second light detector.

24. The sensor of claim 23, wherein:

said light collected by said first light detector is represented by a first intensity $I_1$;

said light collected by said second light detector is represented by a second intensity, $I_2$;

said determining means calculates a value proportional to $(I_1-I_2)/(I_1+I_2)$.

* * * * *